(12) United States Patent
Chang et al.

(10) Patent No.: US 10,394,298 B1
(45) Date of Patent: Aug. 27, 2019

(54) ELECTRONIC DEVICE AND HOT-PLUG PROTECTION CIRCUIT

(71) Applicant: Wiwynn Corporation, New Taipei (TW)

(72) Inventors: Li-Min Chang, New Taipei (TW); Kai Jie Lai, New Taipei (TW); Chia-Hung Yen, New Taipei (TW); Po Yu Chen, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 0 days.

(21) Appl. No.: 15/995,359

(22) Filed: Jun. 1, 2018

(30) Foreign Application Priority Data

Mar. 16, 2018 (TW) .............................. 107109048 A
May 2, 2018 (TW) .............................. 107114861 A

(51) Int. Cl.
*G06F 1/26* (2006.01)
*G06F 1/3203* (2019.01)
*G06F 1/3215* (2019.01)
*G06F 13/40* (2006.01)

(52) U.S. Cl.
CPC ............ *G06F 1/263* (2013.01); *G06F 1/3203* (2013.01); *G06F 1/3215* (2013.01); *G06F 1/266* (2013.01); *G06F 13/409* (2013.01); *G06F 13/4068* (2013.01)

(58) Field of Classification Search
CPC ........ G06F 1/263; G06F 1/266; G06F 1/3203; G06F 1/3215; G06F 13/4068; G06F 13/409
See application file for complete search history.

(56) References Cited

U.S. PATENT DOCUMENTS

| 5,041,889 A | 8/1991 | Kriedt et al. | |
|---|---|---|---|
| 5,376,831 A * | 12/1994 | Chen | H03K 17/166 327/111 |
| 5,930,496 A * | 7/1999 | MacLaren | G06F 13/4072 439/55 |
| 8,547,161 B1 * | 10/2013 | Dalal | H03K 19/0016 327/377 |
| 2017/0220505 A1 * | 8/2017 | Breakstone | G06F 13/4022 |

OTHER PUBLICATIONS

"PCI Express M.2 Specification (Revision 1.1);" Dec. 2016; pp. 1-241.
Chinese language office action dated Aug. 17, 2018, issued in application No. TW 107114861.

* cited by examiner

*Primary Examiner* — Eric T Oberly
(74) *Attorney, Agent, or Firm* — McClure, Qualey & Rodack, LLP

(57) ABSTRACT

An electronic device for communicating with an external device includes a connector, a controller, a first switch element, a second switch element, a first voltage source, a second voltage source, a third voltage source, and a fourth voltage source. When the external device is coupled to the connector, the connector receives a device existence voltage from the external device. The controller generates a first control signal and a second control signal according to the device existence voltage. The first switch element couples the first voltage source or the second voltage source to the connector according to the first control signal. The second switch element couples the third voltage source or the fourth voltage source to an output node according to the second control signal.

20 Claims, 12 Drawing Sheets

ELECTRONIC DEVICE AND HOT-PLUG PROTECTION CIRCUIT

CROSS REFERENCE TO RELATED APPLICATIONS

This Application claims priority of Taiwan Patent Application No. 107109048 filed on Mar. 16, 2018, and further claims priority of Taiwan Patent Application No. 107114861 filed on May 2, 2018, the entirety of which is incorporated by reference herein.

BACKGROUND OF THE INVENTION

Field of the Invention

The disclosure generally relates to an electronic device, and more particularly, to an electronic device for communicating with an external device.

Description of the Related Art

Current electronic devices can be coupled with a variety of external devices. However, since these external devices have different standards, they may not be compatible with some electronic devices, and this limits the uses and applications thereof. Accordingly, there is a need to propose a novel solution for solving the problems of the prior art.

BRIEF SUMMARY OF THE INVENTION

In an exemplary embodiment, the invention is directed to an electronic device for communicating with an external device. The electronic devices includes a connector, a controller, a first switch element, a second switch element, a first voltage source, a second voltage source, a third voltage source, and a fourth voltage source. When the external device is coupled to the connector, the connector receives a device existence voltage from the external device. The controller generates a first control signal and a second control signal according to the device existence voltage. The first voltage source provides a first voltage. The second voltage source provides a second voltage. The first switch element couples the first voltage source or the second voltage source to the connector according to the first control signal, such that the first voltage or the second voltage is used as a supply voltage of the external device. The third voltage source provides a third voltage. The fourth voltage source provides a fourth voltage. The second switch element couples the third voltage source or the fourth voltage source to an output node according to the second control signal, such that the third voltage or the fourth voltage is used as a tunable output voltage at the output node.

In some embodiments, the external device supports an M. 2 standard or an NGSFF (Next Generation Small Form Factor) standard.

In some embodiments, if the external device supports the M. 2 standard, the device existence voltage has a high logic level, and if the external device supports the NGSFF standard, the device existence voltage has a low logic level.

In some embodiments, the external device is an SSD (Solid State Disk).

In some embodiments, the second voltage is higher than the first voltage.

In some embodiments, if the device existence voltage has a high logic level, the first switch element couples the first voltage source to the connector, and if the device existence voltage has a low logic level, the first switch element couples the second voltage source to the connector.

In some embodiments, the fourth voltage is higher than the third voltage.

In some embodiments, if the device existence voltage has a high logic level, the second switch element couples the third voltage source to the output node, and if the device existence voltage has a low logic level, the second switch element couples the fourth voltage source to the output node.

In some embodiments, the electronic device further includes a peripheral element coupled to the output node. The peripheral element receives the tunable output voltage.

In some embodiments, the peripheral element is an expander or a level shifter.

In some embodiments, the fourth voltage source is integrated with the first voltage source so as to form a single voltage source.

In another exemplary embodiment, the invention is directed to an electronic device for communicating with an external device. The electronic devices includes a connector, a controller, a first switch element, a second switch element, a first voltage source, a second voltage source, a third voltage source, a fourth voltage source, and a hot-plug protection circuit. When the external device is coupled to the connector, the connector receives a device existence voltage from the external device. The controller generates a first control signal and a second control signal according to the device existence voltage. The first voltage source provides a first voltage. The second voltage source provides a second voltage. The first switch element couples the first voltage source or the second voltage source to the connector according to the first control signal, such that the first voltage or the second voltage is used as a supply voltage of the external device. The third voltage source provides a third voltage. The fourth voltage source provides a fourth voltage. The second switch element couples the third voltage source or the fourth voltage source to an output node according to the second control signal, such that the third voltage or the fourth voltage is used as a tunable output voltage at the output node. The hot-plug protection circuit is coupled between the first switch element and the connector. When the external device is coupled to the connector, the hot-plug protection circuit enables the supply voltage. When the external device is not coupled to the connector, the hot-plug protection circuit disables the supply voltage.

In some embodiments, the hot-plug protection circuit selectively enables or disables the supply voltage according to a device notification voltage from the connector.

In some embodiments, when the external device is coupled to the connector, the device notification voltage has a low logic level, and when the external device is not coupled to the connector, the device notification voltage has a high logic level.

In some embodiments, the hot-plug protection circuit includes a first resistor, a second resistor, a diode, a third resistor, a capacitor, and a first transistor. The first resistor has a first terminal coupled to the supply voltage, a second terminal coupled to a control node. The voltage at the control node is determined according to the device notification voltage. The second resistor has a first terminal coupled to the control node, and a second terminal coupled to a switch node. The diode has an anode coupled to the control node, and a cathode coupled to the switch node. The third resistor has a first terminal coupled to the switch node, and a second terminal coupled to the supply voltage. The capacitor has a first terminal coupled to the switch node, and a second terminal coupled to the supply voltage. The first transistor has a control terminal coupled to the switch node, a first terminal coupled to the supply voltage, and a second terminal coupled to a voltage output node. The voltage output node is configured to selectively output the supply voltage to the connector.

In another exemplary embodiment, the invention is directed to a hot-plug protection circuit including a first resistor, a second resistor, a diode, a third resistor, a capacitor, and a first transistor. The first resistor has a first terminal coupled to a supply voltage, a second terminal coupled to a control node. The second resistor has a first terminal coupled to the control node, and a second terminal coupled to a switch node. The diode has an anode coupled to the control node, and a cathode coupled to the switch node. The third resistor has a first terminal coupled to the switch node, and a second terminal coupled to the supply voltage. The capacitor has a first terminal coupled to the switch node, and a second terminal coupled to the supply voltage. The first transistor has a control terminal coupled to the switch node, a first terminal coupled to the supply voltage, and a second terminal coupled to a voltage output node.

In some embodiments, the first transistor is a PMOS transistor (P-type Metal Oxide Semiconductor Field Effect Transistor).

In some embodiments, the control node is arranged for receiving a device notification voltage.

In some embodiments, the hot-plug protection circuit further includes a second transistor. The second transistor has a control terminal for receiving a power enable voltage, a first terminal for receiving a device notification voltage, and a second terminal coupled to the control node.

In some embodiments, the hot-plug protection circuit further includes a second transistor, an AND gate, a fourth resistor, a fifth resistor, and a third transistor. The second transistor has a control terminal coupled to a first node, a first terminal coupled to a ground voltage, and a second terminal coupled to the control node. The AND gate has a first input terminal coupled to a second node for receiving a power enable voltage, a second input terminal coupled to a third node, and an output terminal coupled to the first node. The fourth resistor has a first terminal coupled to a fixed voltage, and a second terminal coupled to the second node. The fifth resistor has a first terminal coupled to the fixed voltage, and a second terminal coupled to the third node. The third transistor has a control terminal for receiving a device notification voltage, a first terminal coupled to the ground voltage, and a second terminal coupled to the third node.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
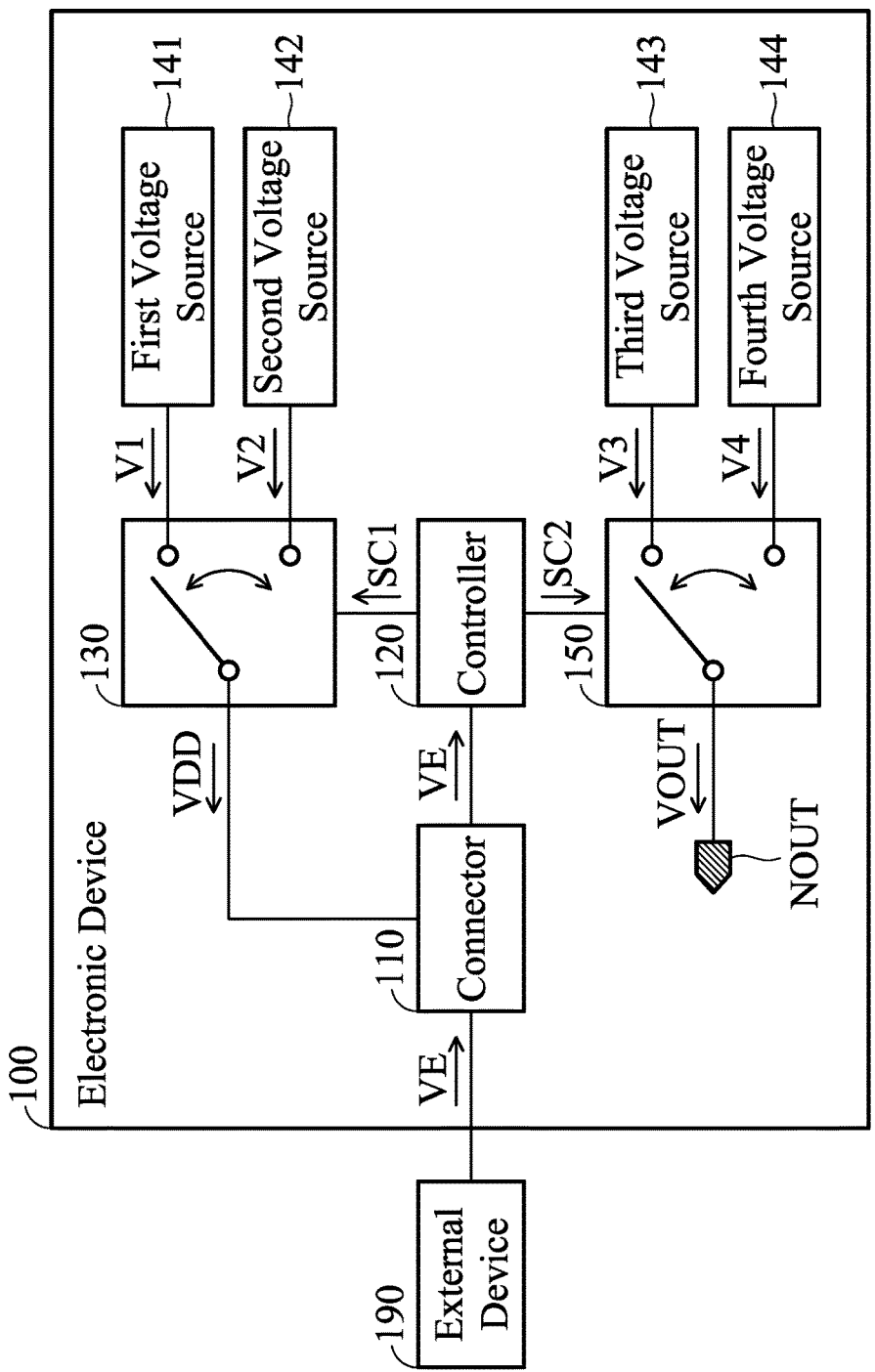
FIG. 1 is a diagram of an electronic device and an external device according to an embodiment of the invention.

FIG. 1 is a diagram of an electronic device 100 and an external device 190 according to an embodiment of the invention. The external device 190 is independent of the electronic device 100. When the external device 190 is coupled to the electronic device 100, the electronic device 100 can communicate with the external device 190, so as to obtain the standard information relative to the external device 190. As shown in FIG. 1, the electronic device 100 includes a connector 110, a controller 120, a first switch element 130, a first voltage source 141, a second voltage source 142, a third voltage source 143, a fourth voltage source 144, and a second switch element 150. For example, the electronic device 100 may be a server, a rack server, a computing device, a backplane, a circuit carrier board, or a host device, but it is not limited thereto. It should be understood that the electronic device 100 may further include other components, such as a housing, a CPU (Central Processing Unit), a GPIO (General-Purpose Input/Output) expander, an I2C (Inter-Integrated Circuit) expander, and/or a power supply module, although they are not displayed in FIG. 1.

The external device 190 can support an M. 2 standard or an NGSFF (Next Generation Small Form Factor) standard. The previous version of the NGSFF standard is an NGFF (Next Generation Form Factor) standard. In some embodiments, the external device 190 is an SSD (Solid State Disk). However, the invention is not limited to the above. In alternative embodiments, the external device 190 may be any type of device for supporting the M. 2 standard or the NGSFF standard.

When the external device 190 is coupled to the connector 110 of the electronic device 100, the connecter 110 receives a device existence voltage VE (also called a "PRSNT" signal) from the external device 190. In some embodiments, the controller 120 is a hardware circuit which is independent of a CPU or the electronic device 100. The controller 120 may be coupled to the connector 110, so as to receive the device existence voltage VE. The controller 120 generates a first control signal SC1 and a second control signal SC2 according to the device existence voltage VE. For example, if the external device 190 supports the M. 2 standard, the device existence voltage VE may have a high logic level (i.e., a logic "1"); and conversely, if the external device 190 supports the NGSFF standard, the device existence voltage VE may have a low logic level (i.e., a logic "0"). By analyzing the level of the device existence voltage VE, the controller 120 can simply determine the standard and the type of the external device 190.

The first voltage source 141 can provide a first voltage V1. The second voltage source 142 can provide a second voltage V2. The second voltage V2 may be higher than the first voltage V1. In some embodiments, the first voltage V1 is equal to 3.3V, and the second voltage V2 is equal to 12V, but they are not limited thereto. For example, the first switch element 130 may be a SPDT (Single-Port Double-Throw) switch. The first switch element 130 couples either the first voltage source 141 or the second voltage source 142 to the connector 110 according to the first control signal SC1, such that either the first voltage V1 of the first voltage source 141 or the second voltage V2 of the second voltage source 142 is used as a supply voltage VDD of the external device 190. For example, if the device existence voltage VE has a high logic level (or the external device 190 supports the M. 2 standard), the first switch element 131 can couple the first voltage source 141 to the connector 110, such that the supply voltage VDD may be equal to the first voltage V1; and conversely, if the device existence voltage VE has a low logic level (or the external device 190 supports the NGSFF standard), the first switch element 130 can couple the second voltage source 142 to the connector 110, such that the supply voltage VDD may be equal to second voltage V2.

The third voltage source 143 can provide a third voltage V3. The fourth voltage source 144 can provide a fourth voltage V4. The fourth voltage V4 may be higher than the third voltage V3. In some embodiments, the third voltage V3 is equal to 1.8V, and the fourth voltage V4 is equal to 3.3V, but they are not limited thereto. For example, the second switch element 150 may be another SPDT switch. The second switch element 150 couples either the third voltage source 143 or the fourth voltage source 144 to an output node NOUT of the electronic device 100 according to the second control signal SC2, such that either the third voltage V3 of the third voltage source 143 or the fourth voltage V4 of the fourth voltage source 144 is used as a tunable output voltage VOUT at the output node NOUT. For example, if the device existence voltage VE has a high logic level (or the external device 190 supports the M. 2 standard), the second switch element 150 can couple the third voltage source 143 to the output node NOUT, such that the tunable output voltage VOUT may be equal to the third voltage V3; and conversely, if the device existence voltage VE has a low logic level (or the external device 190 supports the NGSFF standard), the second switch element 150 can couple the fourth voltage source 144 to the output node NOUT, such that the tunable output voltage VOUT may be equal to the fourth voltage V4.

With the design of the invention, the electronic device 100 can automatically determine the standard and the type of the external device 190, so as to provide the corresponding supply voltage VDD and the corresponding tunable output voltage VOUT. Accordingly, the invention has at least the advantages of both reducing the system design cost and increasing the system freedom. When a user operates the electronic device 100, there is no need to replace any component of the electronic device 100, regardless of the standard of the external device 190. This will significantly improve the ease of use of the invention.

Figure 2A:
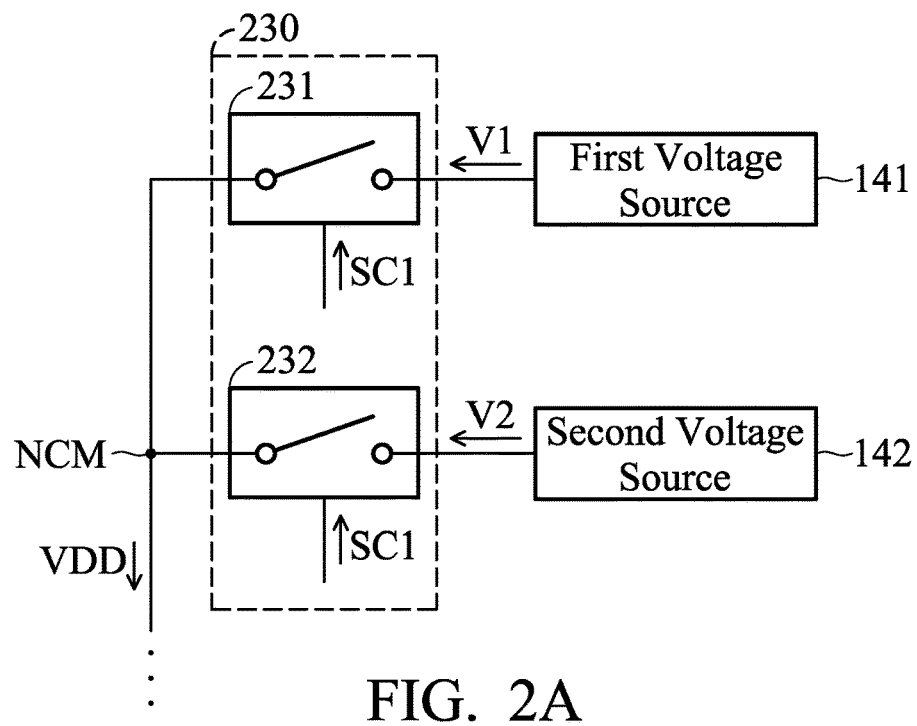
FIG. 2A is a diagram of a first switch element according to an embodiment of the invention.

FIG. 2A is a diagram of a first switch element 230 according to an embodiment of the invention. In the embodiment of FIG. 2A, the first switch element 230 includes a first sub-switch element 231 and a second sub-switch element 232. The first sub-switch element 231 is coupled between the first voltage source 141 and a common node NCM. The second sub-switch element 232 is coupled between the second voltage source 142 and the common node NCM. The common node NCM is arranged for outputting the supply voltage VDD to the connector 110. The first control signal SC1 can close one of the first sub-switch element 231 and the second sub-switch element 232, and open the other of the first sub-switch element 231 and the second sub-switch element 232. Thus, the supply voltage VDD is equal to either the first voltage V1 or the second voltage V2. For example, if the device existence voltage VE has a high logic level (or the external device 190 supports the M. 2 standard), the first sub-switch element 231 may be closed and the second sub-switch element 232 may be opened, such that the supply voltage VDD may be equal to the first voltage V1; and conversely, if the device existence voltage VE has a low logic level (or the external device 190 supports the NGSFF standard), the first sub-switch element 231 may be opened and the second sub-switch element 232 may be opened, such that the supply voltage VDD may be equal to second voltage V2. Other features of FIG. 2A are similar to those of the electronic device 100 of FIG. 1. Accordingly, the two embodiments can achieve similar levels of performance.

Figure 2B:
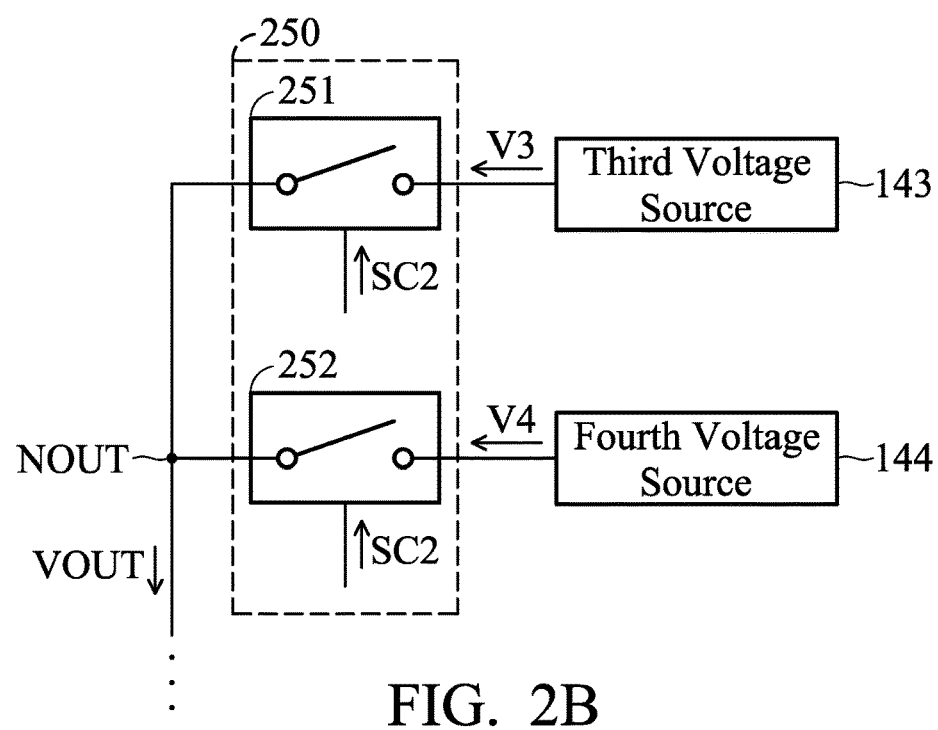
FIG. 2B is a diagram of a second switch element according to an embodiment of the invention.

FIG. 2B is a diagram of a second switch element 250 according to an embodiment of the invention. In the embodiment of FIG. 2B, the second switch element 250 includes a third sub-switch element 251 and a fourth sub-switch element 252. The third sub-switch element 251 is coupled between the third voltage source 143 and the output node NOUT. The fourth sub-switch element 252 is coupled between the fourth voltage source 144 and the output node NOUT. The output node NOUT is arranged for outputting the tunable output voltage VOUT. The second control signal SC2 can close one of the third sub-switch element 251 and the fourth sub-switch element 252, and open the other of the third sub-switch element 251 and the fourth sub-switch element 252. Thus, the tunable output voltage VOUT is equal to either the third voltage V3 or the fourth voltage V4. For example, if the device existence voltage VE has a high logic level (or the external device 190 supports the M. 2 standard), the third sub-switch element 251 can be closed and the fourth sub-switch element 252 can be opened, such that the tunable output voltage VOUT may be equal to the third voltage V3; and conversely, if the device existence voltage VE has a low logic level (or the external device 190 supports the NGSFF standard), the third sub-switch element 251 can be opened and the fourth sub-switch element 252 can be closed, such that the tunable output voltage VOUT may be equal to the fourth voltage V4. Other features of FIG. 2B are similar to those of the electronic device 100 of FIG. 1. Accordingly, the two embodiments can achieve similar levels of performance.

Figure 3A:
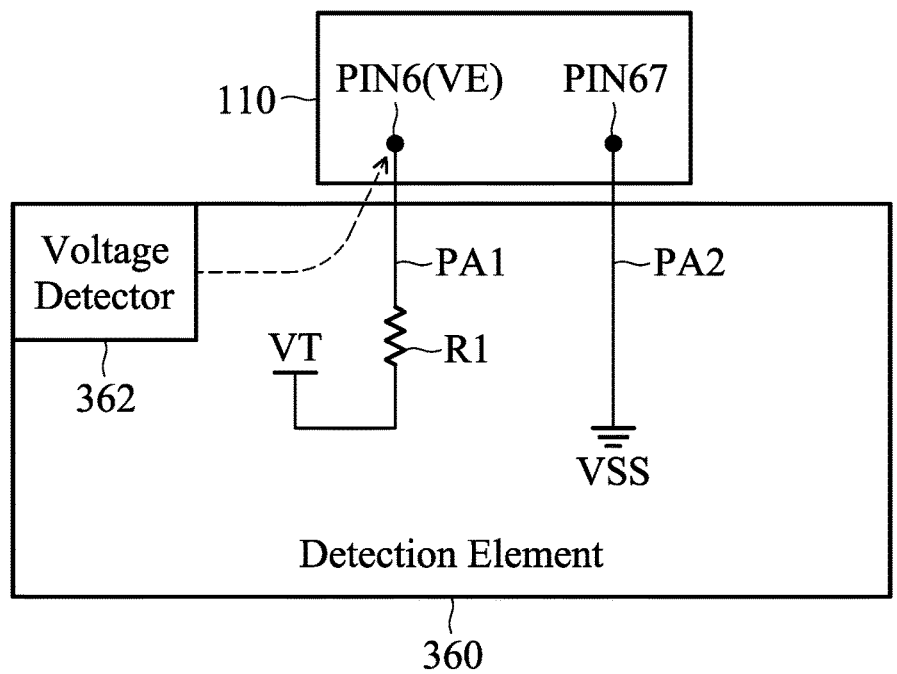
FIG. 3A is a diagram of a detection mechanism of an electronic device according to an embodiment of the invention.

FIG. 3A is a diagram of a detection mechanism of the electronic device 100 according to an embodiment of the invention. In the embodiment of FIG. 3A, the controller 120 further includes a detection element 360. The detection element 360 includes a voltage detector 362, a first current path PA1, a second current path PA2, and a resistor R1. The voltage detector 362 may be implemented with a voltmeter. Each of the first current path PA1 and the second current path PA2 may be implemented with a metal conductive line. The resistor R1 may be a fixed resistor or a variable resistor. Specifically, the connector 110 has a first pin PIN6 and a second pin PIN67. When the external device 190 supporting the M. 2 standard is coupled to the connector 110, an open-circuited path is formed between the first pin PIN6 and the second pin PIN67. The controller 120 uses the detection element 360 to obtain the device existence voltage VE at the first pin PIN6. For example, the first pin PIN6 may be coupled through the first current path PA1 and the resistor R1 to a test supply voltage VT (e.g., equal to the supply voltage VDD), and the second pin PIN67 may be coupled through the second current path PA2 to a ground voltage VSS (e.g., equal to 0V). Since the first pin PIN6 is electrically isolated from the second pin PIN67, the voltage detector 362 determines that the device existence voltage VE at the first pin PIN6 has a high logic level (i.e., the test supply voltage VT). Other features of FIG. 3A are similar to those of the electronic device 100 of FIG. 1. Accordingly, the two embodiments can achieve similar levels of performance.

Figure 3B:
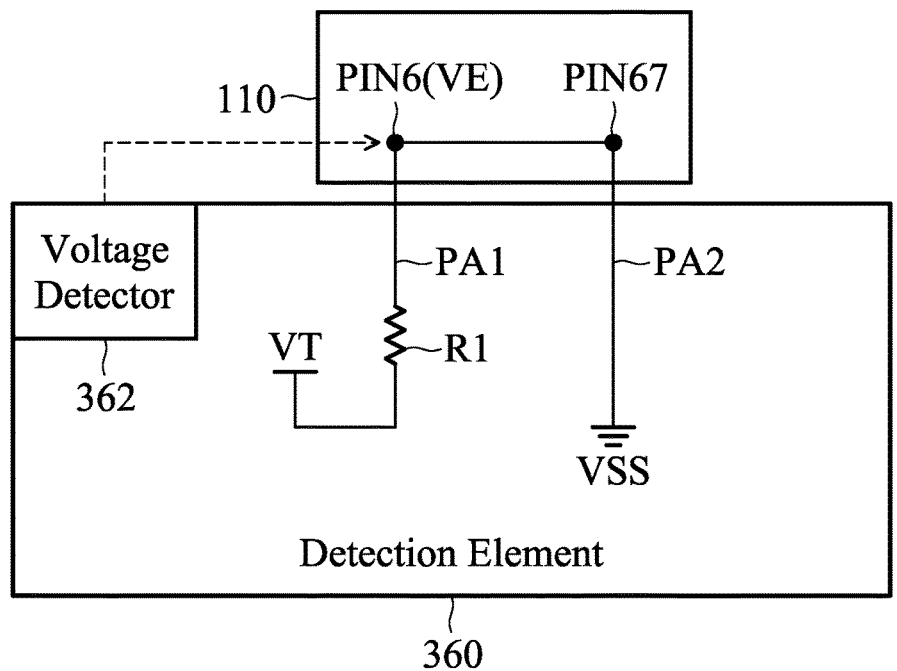
FIG. 3B is a diagram of a detection mechanism of an electronic device according to another embodiment of the invention.

FIG. 3B is a diagram of a detection mechanism of the electronic device 100 according to another embodiment of the invention. FIG. 3B is similar to FIG. 3A. In the embodiment of FIG. 3B, when the external device 190 supporting the NGSFF standard is coupled to the connector 110, a short-circuited path is formed between the first pin PIN6 and the second pin PIN67. Since the first pin PIN6 is electrically connected to the second pin PIN67, the voltage detector 362 determines that the device existence voltage VE at the first pin PIN6 has a low logic level (i.e., the ground voltage VSS). Other features of FIG. 3B are similar to those of the electronic device 100 of FIG. 1. Accordingly, the two embodiments can achieve similar levels of performance.

Figure 4:
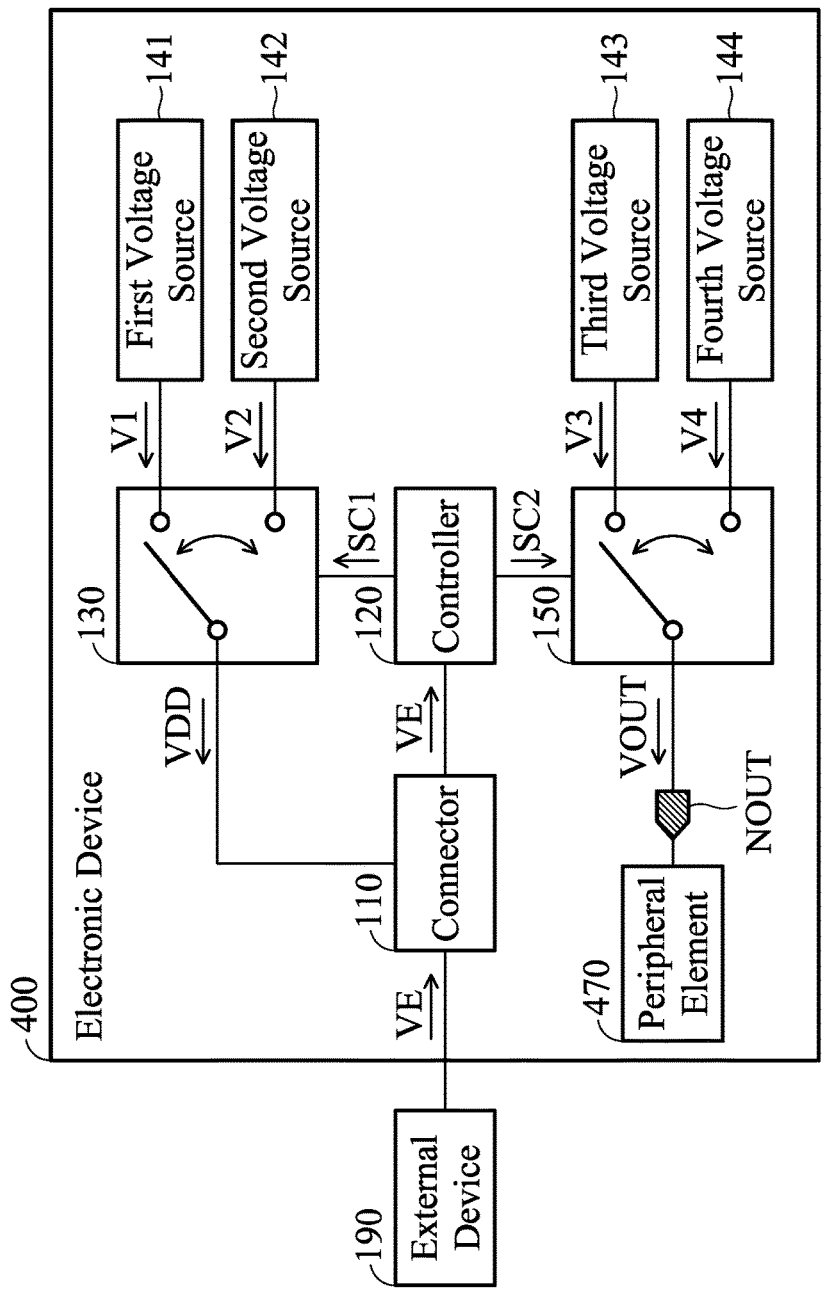
FIG. 4 is a diagram of an electronic device and an external device according to another embodiment of the invention.

FIG. 4 is a diagram of an electronic device 400 and the external device 190 according to another embodiment of the invention. In the embodiment of FIG. 4, the electronic device 400 further includes a peripheral element 470. The peripheral element 470 is coupled to the output node NOUT for receiving the tunable output voltage VOUT. For example, the peripheral element 470 may be an expander or a level shifter, but it is not limited thereto. Other features of the electronic device 400 of FIG. 4 are similar to those of the electronic device 100 of FIG. 1. Accordingly, the two embodiments can achieve similar levels of performance.

Figure 5:
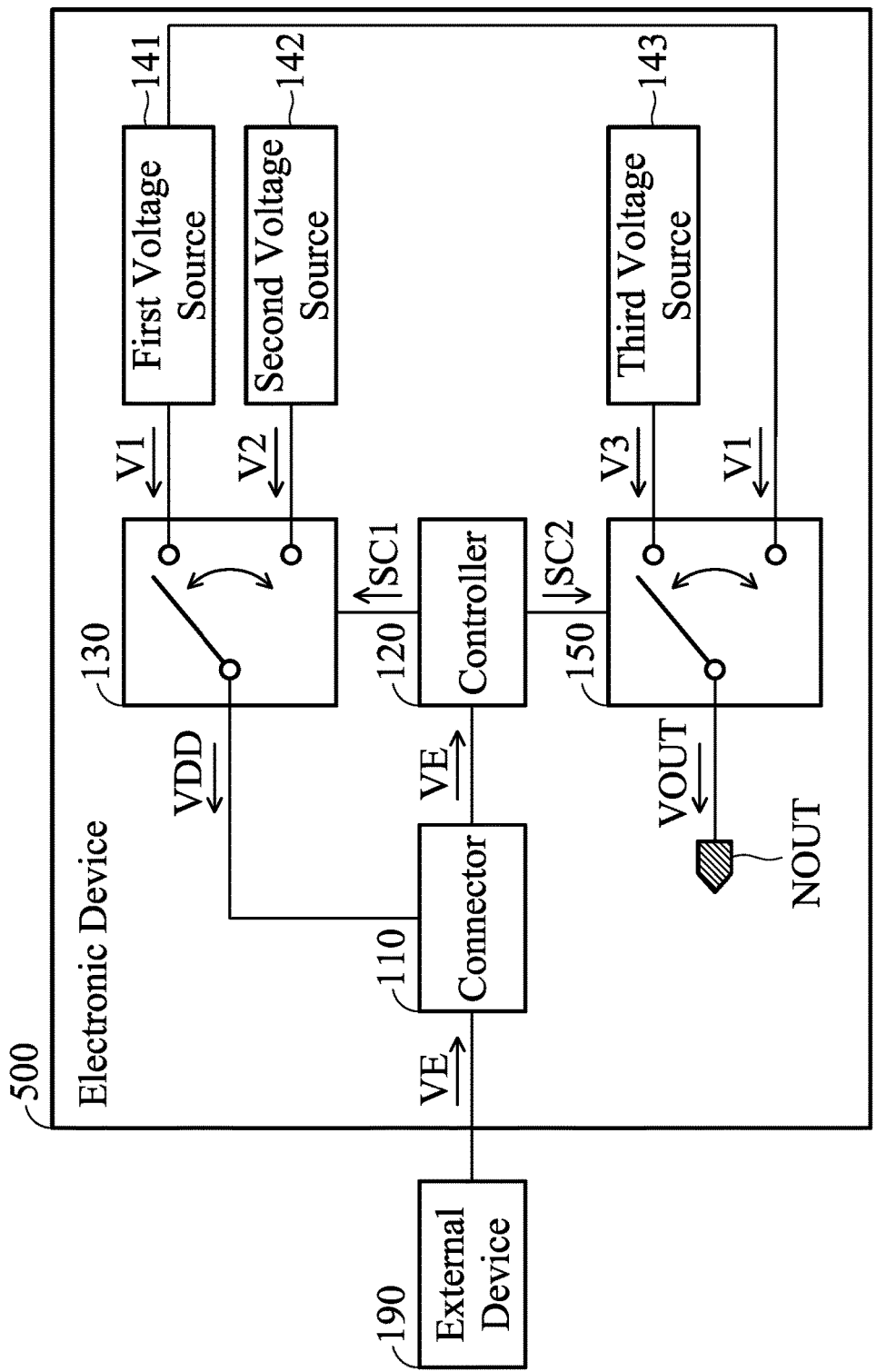
FIG. 5 is a diagram of an electronic device and an external device according to another embodiment of the invention.

FIG. 5 is a diagram of an electronic device 500 and the external device 190 according to another embodiment of the invention. In the embodiment of FIG. 5, the fourth voltage source 144 is integrated with the first voltage source 141 so as to form a single voltage source of the electronic device 500. For example, the electronic device 500 may include only the first voltage source 141, the second voltage source 142, and the third voltage source 143. The fourth voltage source 144 may be omitted to reduce the total manufacturing cost. Thus, the aforementioned fourth voltage V4 may be equal to the first voltage V1, and the first voltage source 141 can provide the first voltage V1 for both the first switch element 130 and the second switch element 150 (i.e., the aforementioned fourth voltage V4 is replaced with the first voltage V1). Other features of the electronic device 500 of FIG. 5 are similar to those of the electronic device 100 of FIG. 1. Accordingly, the two embodiments can achieve similar levels of performance.

Figure 6:
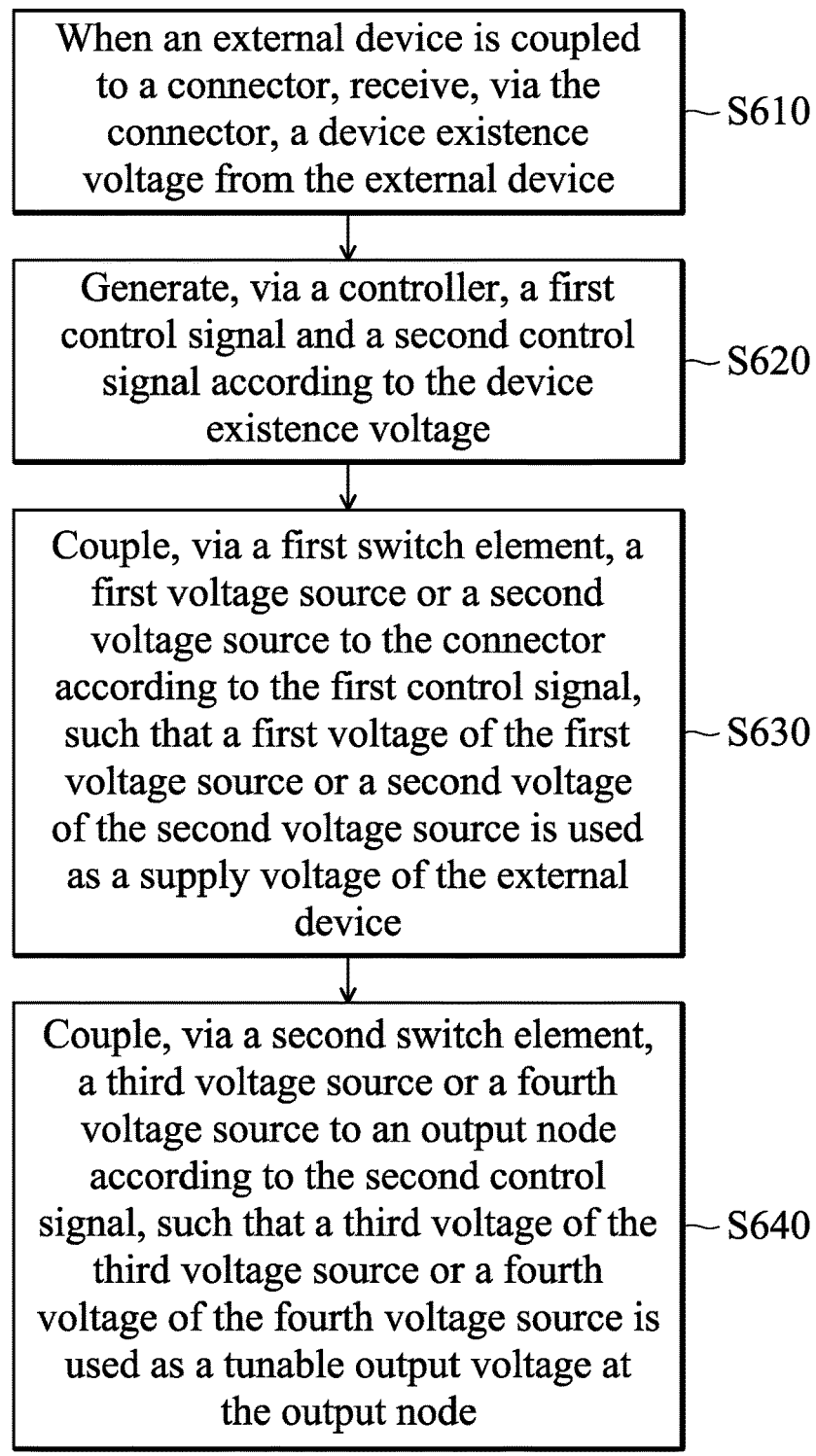
FIG. 6 is a flowchart of a control method according to an embodiment of the invention.

FIG. 6 is a flowchart of a control method according to an embodiment of the invention. The control method includes the following steps. In step S610, when an external device is coupled to a connector, a device existence voltage is received by the connector from the external device. In step S620, a first control signal and a second control signal are generated by a controller according to the device existence voltage. In step S630, a first voltage source or a second voltage source is coupled to the connector by a first switch element according to the first control signal, such that a first voltage of the first voltage source or a second voltage of the second voltage source is used as a supply voltage of the external device. In step S640, a third voltage source or a fourth voltage source is coupled to an output node by a second switch element according to the second control signal, such that a third voltage of the third voltage source or a fourth voltage of the fourth voltage source is used as a tunable output voltage at the output node. It should be noted that the above steps are not required to be performed in order, and any feature of the electronic devices of the embodiments of FIGS. 1-5 may be applied to the control method of FIG. 6.

Figure 7:
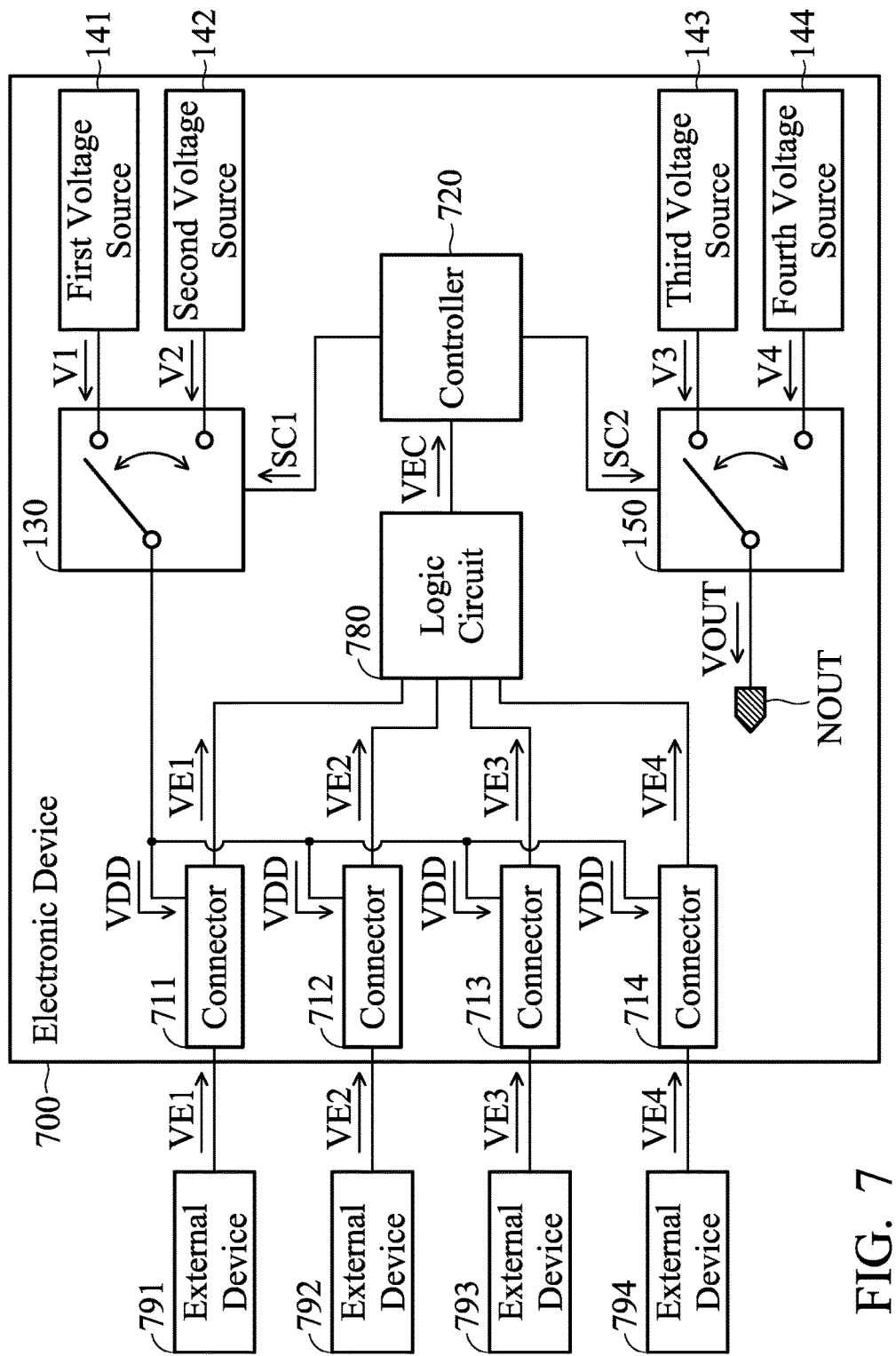
FIG. 7 is a diagram of an electronic device and a plurality of external devices according to another embodiment of the invention.

FIG. 7 is a diagram of an electronic device 700 and a plurality of external devices 791, 792, 793 and 794 according to another embodiment of the invention. FIG. 7 is similar to FIG. 1. In the embodiment of FIG. 7, the electronic device 700 includes a plurality of connectors 711, 712, 713 and 714, a controller 720, a first switch element 130, a first voltage source 141, a second voltage source 142, a third voltage source 143, a fourth voltage source 144, a second switch element 150, and a logic circuit 780. One or more of the external devices 791, 792, 793 and 794 can support the M. 2 standard or the NGSFF standard. When the external devices 791, 792, 793 and 794 are respectively coupled to the connectors 711, 712, 713 and 714 of the electronic device 700, the connectors 711, 712, 713 and 714 receive a plurality of device existence voltages VE1, VE2, VE3 and VE4 from the external devices 791, 792, 793 and 794, respectively. For example, if the external device 791 supports the M. 2 standard, the device existence voltage VE1 may have a high logic level. For example, if the external device 792 supports the NGSFF standard, the device existence voltage VE2 may have a low logic level. On the other hand, if one or more of the connectors 711, 712, 713 and 714 are not connected to any external device, the corresponding one or more of the device existence voltages VE1, VE2, VE3 and VE4 may be omitted. In other words, the device existence voltages VE1, VE2, VE3 and VE4 have the same or different logic levels in response to a variety of types of the external devices 791, 792, 793 and 794. The logic circuit 780 processes the device existence voltages VE1, VE2, VE3 and VE4, and generates an indication existence voltage VEC according to the device existence voltages VE1, VE2, VE3 and VE4. The indication existence voltage VEC may represent a logic operation result of the device existence voltages VE1, VE2, VE3 and VE4. For example, the logic circuit 780 may perform an OR logic operation or an AND logic operation to the device existence voltages VE1, VE2, VE3 and VE4, but it is not limited thereto. The controller 720 generates a first control signal SC1 and a second control signal SC2 according to the indication existence voltage VEC, so as to control the first switch element 130 and the second switch element 150, respectively. The operation principles of the first switch element 130, the second switch element 150, the first voltage source 141, the second voltage source 142, the third voltage source 143, and the fourth voltage source 144 have been described in the above embodiments. It should be noted that considering the design factors of heat dissipation capability and current carrying capability, the electronic device 700 may include more or fewer connectors corresponding to more or fewer external devices in other embodiments although there are merely four external devices 791, 792, 793 and 794 and four connectors 711, 712, 713 and 714 displayed in FIG. 7.

In some embodiments, the M. 2 standard is set as a prior standard (prior to the NGSFF standard). Specifically, if any one of the device existence voltages VE1, VE2, VE3 and VE4 has a high logic level (or any one of the external devices 791, 792, 793 and 794 coupled to the connectors 711, 712, 713 and 714 supports the M. 2 standard), the electronic device 700 may provide a power supply using the M. 2 standard. For example, the first switch element 130 may switch to the first voltage source 141, and the second switch element 150 may switch to the third voltage source 143, such that the supply voltage VDD may be equal to the first voltage V1, and the tunable output voltage VOUT may be equal to the third voltage V3. Conversely, if each of the device existence voltages VE1, VE2, VE3 and VE4 does not have a high logic level (or each of the external devices 791, 792, 793 and 794 coupled to the connectors 711, 712, 713 and 714 does not support the M. 2 standard), the electronic device 700 may provide a power supply using the NGSFF standard. For example, the first switch element 130 may switch to the second voltage source 142, and the second switch element 150 may switch to the fourth voltage source 144, such that the supply voltage VDD may be equal to the second voltage V2, and the tunable output voltage VOUT may be equal to the fourth voltage V4.

For example, if the connectors 711, 712, 713 and 714 are respectively coupled to the external devices 791, 792, 793 and 794 supporting the M. 2 standard, the first switch element 130 may switch to the first voltage source 141, and the second switch element 150 may switch to the third voltage source 143. For example, if the connectors 711, 712, 713 and 714 are respectively coupled to the external devices 791, 792, 793 and 794 supporting the NGSFF standard, the first switch element 130 may switch to the second voltage source 142, and the second switch element 150 may switch to the fourth voltage source 144. For example, if the connector 711 is coupled to the external device 791 supporting the M. 2 standard and the connectors 712, 713 and 714 are respectively coupled to the external devices 792, 793 and 794 supporting the NGSFF standard, the first switch element 130 may switch to the first voltage source 141, and the second switch element 150 may switch to the third voltage source 143; furthermore, the logic circuit 780 may disable the power supply of the connectors 712, 713 and 714 (i.e., the supply voltage VDD can be transmitted to only the connector 711, but cannot be transmitted to the connectors 712, 713 and 714). For example, if the connectors 711 and 712 are respectively coupled to the external devices 791 and 792 supporting the M. 2 standard and the connectors 713 and 714 are respectively coupled to the external devices 793 and 794 supporting the NGSFF standard, the first switch element 130 may switch to the first voltage source 141, and the second switch element 150 may switch to the third voltage source 143; furthermore, the logic circuit 780 may enable the power supply of all of the connectors 711, 712, 713 and 714 (i.e., the supply voltage VDD can be transmitted all of the connectors 711, 712, 713 and 714). For example, if the connectors 711 and 712 are respectively coupled to the external devices 791 and 792 supporting the M. 2 standard and the connectors 713 and 714 are respectively coupled to the external devices 793 and 794 supporting the NGSFF standard, the first switch element 130 may switch to the first voltage source 141, and the second switch element 150 may switch to the third voltage source 143; furthermore, the logic circuit 780 may disable the power supply of the connectors 713 and 714 (i.e., the supply voltage VDD can be transmitted to only the connectors 711 and 712, but cannot be transmitted to the connectors 713 and 714). For example, if the connector 711 is coupled to the external device 791 supporting the M. 2 standard, the connectors 712 is coupled to the external device 792 supporting the NGSFF standard, and the connectors 713 and 714 are not coupled to any external device (i.e., the external devices 793 and 794 are omitted), the first switch element 130 may switch to the first voltage source 141, and the second switch element 150 may switch to the third voltage source 143; furthermore, the logic circuit 780 may disable the power supply of the connectors 712, 713 and 714 (i.e., the supply voltage VDD can be transmitted to only the connector 711, but cannot be transmitted to the connectors 712, 713 and 714). For example, if the connectors 711 and 712 are respectively coupled to the external devices 791 and 792 supporting the NGSFF standard and the connectors 713 and 714 are not coupled to any external device (i.e., the external devices 793 and 794 are omitted), the first switch element 130 may switch to the second voltage source 142, and the second switch element 150 may switch to the fourth voltage source 144; furthermore, the logic circuit 780 may disable the power supply of the connectors 713 and 714 (i.e., the supply voltage VDD can be transmitted to only the connectors 711 and 712, but cannot be transmitted to the connectors 713 and 714). For example, if the connectors 711 and 712 are respectively coupled to the external devices 791 and 792 supporting the M. 2 standard and the connectors 713 and 714 are not coupled to any external device (i.e., the external devices 793 and 794 are omitted), the first switch element 130 may switch to the first voltage source 141, and the second switch element 150 may switch to the third voltage source 143; furthermore, the logic circuit 780 may enable the power supply of all of the connectors 711, 712, 713 and 714 (i.e., the supply voltage VDD can be transmitted all of the connectors 711, 712, 713 and 714). Other features of the electronic device 700 of FIG. 7 are similar to those of the electronic device 100 of FIG. 1. Accordingly, the two embodiments can achieve similar levels of performance.

Figure 8:
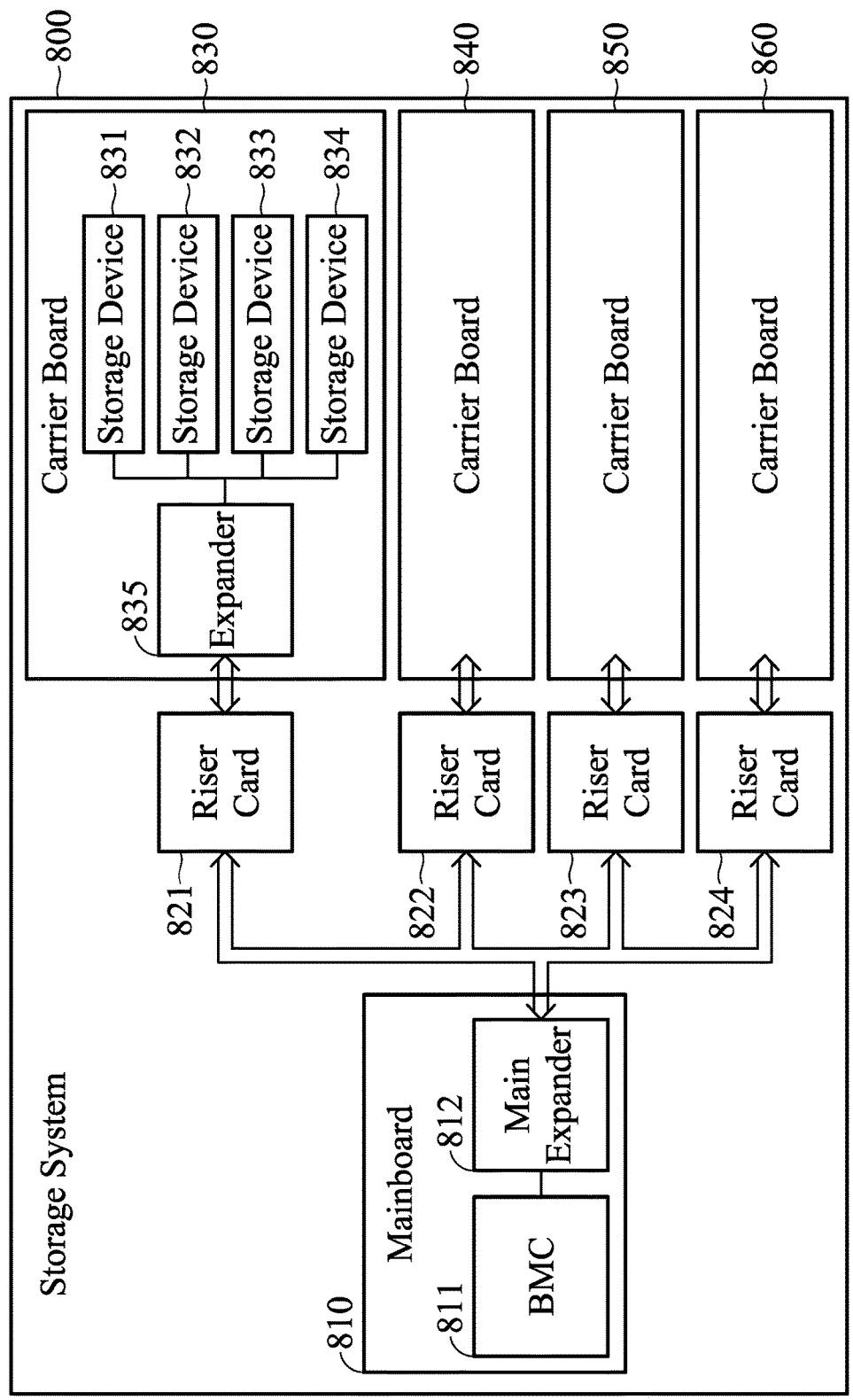
FIG. 8 is a diagram of a storage system according to another embodiment of the invention.

FIG. 8 is a diagram of a storage system 800 according to another embodiment of the invention. The storage system 800 may be a hot storage device. The hot storage device may be a portion of a rack server, and it may include a variety of applications of the electronic devices described in the above embodiments. In the embodiment of FIG. 8, the storage system 800 at least includes a mainboard 810, and one or more carrier boards 830, 840, 850 and 860 coupled to the mainboard 810. The storage system 800 may further include one or more riser cards 821, 822, 823 and 824. Each of the riser cards 821, 822, 823 and 824 may be coupled between the mainboard 810 and a respective one of the carrier boards 830, 840, 850 and 860. Specifically, the mainboard 810 includes a BMC (Base Board Manager Controller) 811 and a main expander 812 (e.g., an I2C expander), and each of the carrier boards 830, 840, 850 and 860 includes one or more storage devices 831, 832, 833 and 834 and an expander 835 (e.g., an I2C expander). FIG. 8 uses the carrier board 830 as an example, and each of the other carrier boards 840, 850 and 860 may have the same structure as that of the carrier board 830. It should be understood that each "carrier board" of FIG. 8 may be equivalent to the above "electronic device", each "storage device" of FIG. 8 may be equivalent to the above "external device", and their inner components and relative functions have been described in the embodiments of FIGS. 1 to 7. In the embodiment of FIG. 8, the external device (e.g., the storage device 831) is integrated with the electronic device (e.g., the carrier board 830), and it becomes a portion of the electronic device. Specifically, the expander 835 of the carrier board 830 can obtain the standard information (e.g., the M. 2 standard or the NGSFF standard) relative to the storage devices 831, 832, 833 and 834, and the standard information can be transmitted through the riser card 821 to the main expander 812 of the mainboard 810, such that the BMC 811 of the mainboard 810 can receive the standard information relative to the storage devices 831, 832, 833 and 834 by reading the main expander 812. It should be noted that the storage system 800 may include more or fewer riser cards, more or fewer carrier boards, and more or fewer storage devices in other embodiments although there are four riser cards 821, 822, 823 and 824, four carrier boards 830, 840, 850 and 860, and four storage devices 831, 832, 833 and 834 displayed in FIG. 8. For example, if the carrier board 830 includes only two storage devices, the main expander 812 of the mainboard 810 can communicate with the expander 835 of the carrier board 830, so as to obtain the total number of the storage devices. Other features of the storage system of FIG. 8 are similar to those of the electronic devices 100 to 700 of FIGS. 1 to 7. Accordingly, these embodiments can achieve similar levels of performance.

Figure 9:
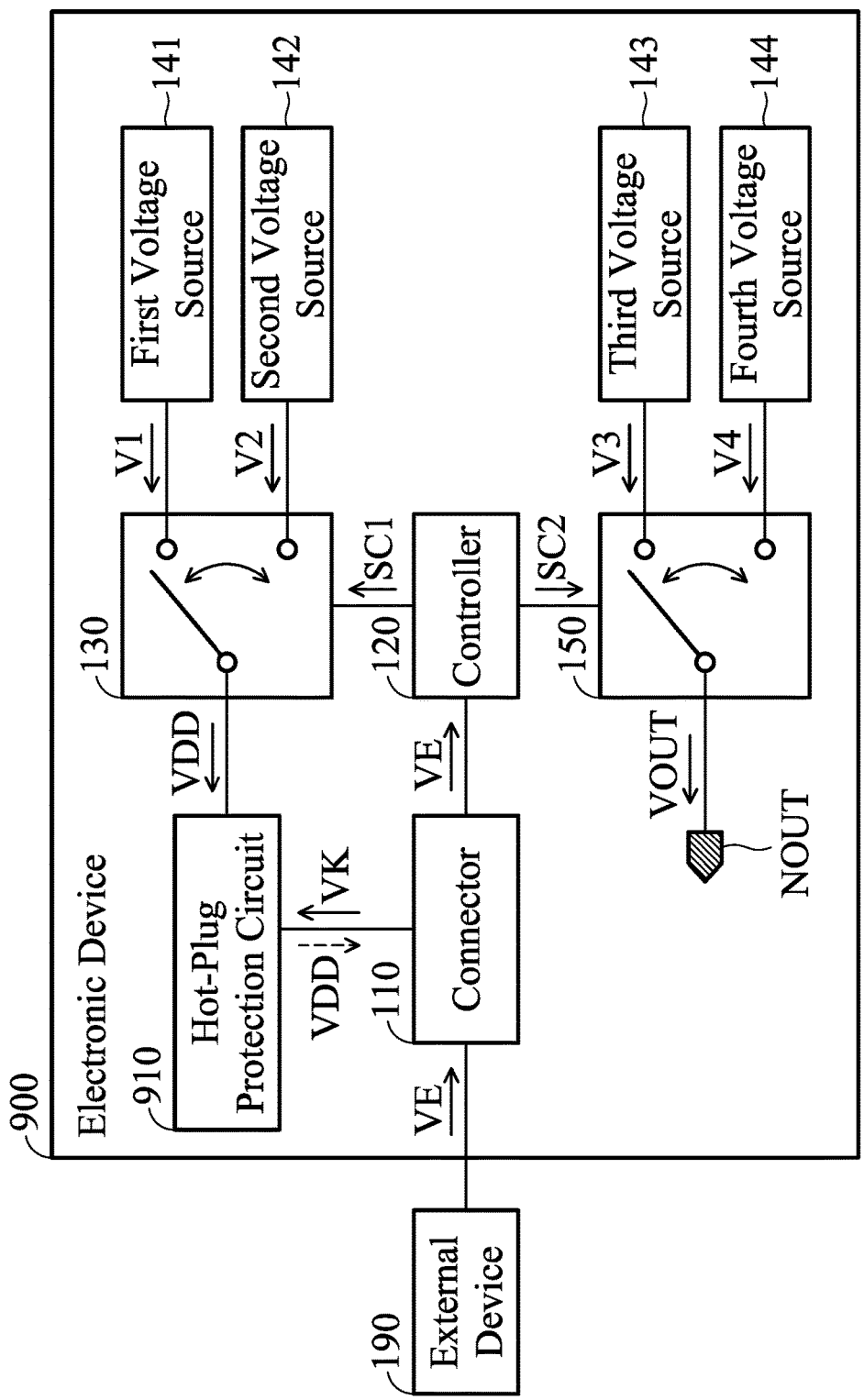
FIG. 9 is a diagram of an electronic device and an external device according to another embodiment of the invention.

FIG. 9 is a diagram of an electronic device 900 and an external device 190 according to another embodiment of the invention. FIG. 9 is similar to FIG. 1. In the embodiment of FIG. 9, the electronic device 900 further includes a hot-plug protection circuit 910. The hot-plug protection circuit 910 is coupled between the first switch element 130 and the connector 110. The hot-plug protection circuit 910 is used as a switchable element operating in a closed state or an open state. When the external device 190 is coupled to the connector 110, the hot-plug protection circuit 910 enables the supply voltage VDD. That is, the supply voltage VDD can be transmitted from the first switch element 130 through the hot-plug protection circuit 910 to the connector 110. Conversely, when the external device 190 is not coupled to the connector 110, the hot-plug protection circuit 910 disables the supply voltage VDD. That is, the hot-plug protection circuit 910 can block the supply voltage VDD, so as to prevent the connector 110 from receiving the supply voltage VDD. In some embodiments, the hot-plug protection circuit 910 selectively enables or disables the supply voltage VDD according to a device notification voltage VK from the connector 110. For example, when the external device 190 is coupled to the connector 110, the device notification voltage VK may have a low logic level, and when the external device 190 is not coupled to the connector 110, the device notification voltage VK may have a high logic level. It should be noted that the device notification voltage VK is different from the aforementioned device existence voltage VE. If any external device 190 is coupled to the connector 110, the device notification voltage VK of the connector 110 will be pulled down to a low logic level, regardless of such external device 190 supporting the M. 2 standard or the NGSFF standard. In the embodiment of FIG. 9, the connector 110 is not supplied by the supply voltage VDD on the condition that the external device 190 is removed. Such a design can reduces the total power consumption, avoid the risk of short-circuited damage, and omit the pre-charge circuit required by the conventional design, so as to decrease the total manufacturing cost. Other features of the electronic device 900 of FIG. 9 are similar to those of the electronic devices 100 to 700 of FIGS. 1 to 7. Accordingly, these embodiments can achieve similar levels of performance.

The following embodiments will introduce a variety of circuit configurations of the hot-plug protection circuit 910. It should be understood that these figures and descriptions are merely exemplary, rather than limitations of the invention.

Figure 10:
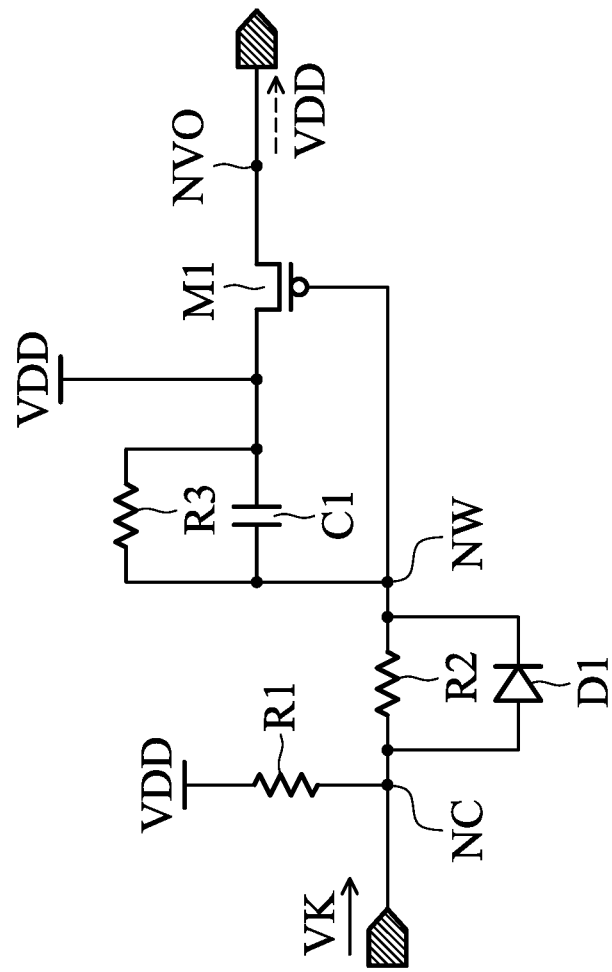
FIG. 10 is a diagram of a hot-plug protection circuit according to an embodiment of the invention.

FIG. 10 is a diagram of a hot-plug protection circuit 920 according to an embodiment of the invention. In the embodiment of FIG. 10, the hot-plug protection circuit 920 includes a first resistor R1, a second resistor R2, a third resistor R3, a diode D1, a capacitor C1, and a first transistor M1. The first transistor M1 may be a PMOS transistor (P-type Metal Oxide Semiconductor Field Effect Transistor). The first resistor R1 has a first terminal coupled to the supply voltage VDD, a second terminal coupled to a control node NC. As mentioned above, the supply voltage VDD may be from the first switch element 130, and the supply voltage VDD may be equal to either the first voltage V1 or the second voltage V2. The voltage at the control node NC is determined according to the device notification voltage VK. For example, the control node NC may directly or indirectly receive the device notification device VK, but it is not limited thereto. The second resistor R2 has a first terminal coupled to the control node NC, and a second terminal coupled to a switch node NW. The diode D1 has an anode coupled to the control node NC, and a cathode coupled to the switch node NW. The third resistor R3 has a first terminal coupled to the switch node NW, and a second terminal coupled to the supply voltage VDD. The capacitor C1 has a first terminal coupled to the switch node NW, and a second terminal coupled to the supply voltage VDD. The first transistor M1 has a control terminal coupled to the switch node NW, a first terminal coupled to the supply voltage VDD, and a second terminal coupled to a voltage output node NVO. The voltage output node NVO may be further coupled to the connector 110. The voltage output node NVO is configured to selectively output the supply voltage VDD to the connector 110.

The operation principles of the hot-plug protection circuit 920 may be as follows. When the device notification voltage VK has a low logic level, the voltage at the switch node NW is pulled down and the first transistor M1 is turned on, such that the voltage output node NVO can output the supply voltage VDD to the connector 110. Conversely, when the device notification voltage VK has a high logic level, the voltage at the switch node NW is pulled up and the first transistor M1 is turned off, such that the voltage output node NVO cannot output the supply voltage VDD to the connector 110. On the other hand, a combination of the second resistor R2, the diode D1, the third resistor R3, and the capacitor C1 is used as a soft-start circuit. The soft-start circuit is configured to slowly turn on and quickly turn off the first transistor M1, so as to suppress the initial inrush currents and increase the reliability of the whole circuitry. In some embodiments, the resistance ratio of the second resistor R2 to the third resistor R3 is from ½ to 1, such as ⅔. For example, the resistance of the second resistor R2 may be about 200 kΩ, the resistance of the third resistor R3 may be about 300 kΩ, and the capacitance of the capacitor C1 may be about 0.1 µF. According to practical measurements, the above ranges of resistances and capacitance can provide a sufficiently large RC time constant and enhance the performance of the soft-start circuit.

Figure 11:
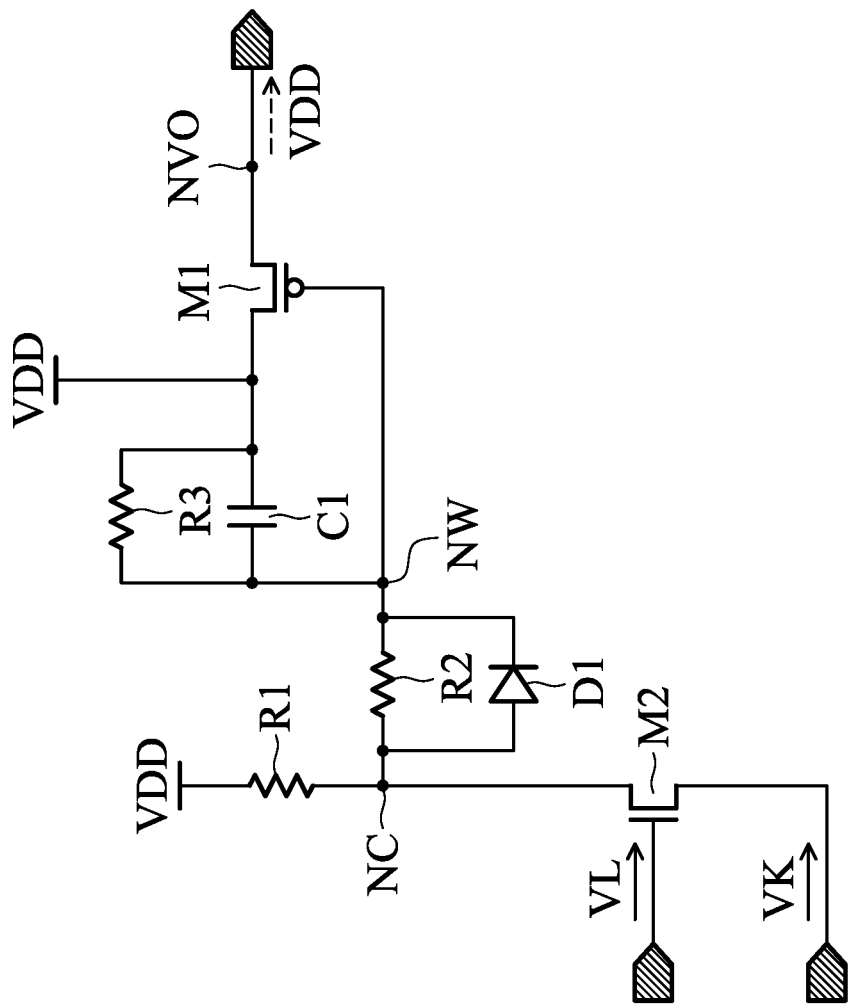
FIG. 11 is a diagram of a hot-plug protection circuit according to another embodiment of the invention.

FIG. 11 is a diagram of a hot-plug protection circuit 930 according to another embodiment of the invention. FIG. 11 is similar to FIG. 10. In the embodiment of FIG. 11, the hot-plug protection circuit 930 further includes a second transistor M2. The second transistor M2 may be an NMOS transistor (N-type Metal Oxide Semiconductor Field Effect Transistor). The second transistor M2 has a control terminal for receiving a power enable voltage VL, a first terminal for receiving the device notification voltage VK, and a second terminal coupled to the control node NC. The power enable voltage VL may be generated by a processor (not shown) according to a software program. The power enable voltage VL is auxiliary and helps to control the hot-plug protection circuit 930 to determine whether to output the supply voltage VDD to the connector 110. Specifically, only when the power enable voltage VL has a high logic level and the device notification voltage VK has a low logic level, the voltage at the control node NC is pulled down to a low logic level, such that the voltage output node NVO of the hot-plug protection circuit 930 can output the supply voltage VDD; otherwise, the voltage output node NVO of the hot-plug protection circuit 930 cannot output the supply voltage VDD. Other features of the hot-plug protection circuit 930 of FIG. 11 are similar to those of the hot-plug protection circuit 920 of FIG. 10. Accordingly, these embodiments can achieve similar levels of performance.

Figure 12:
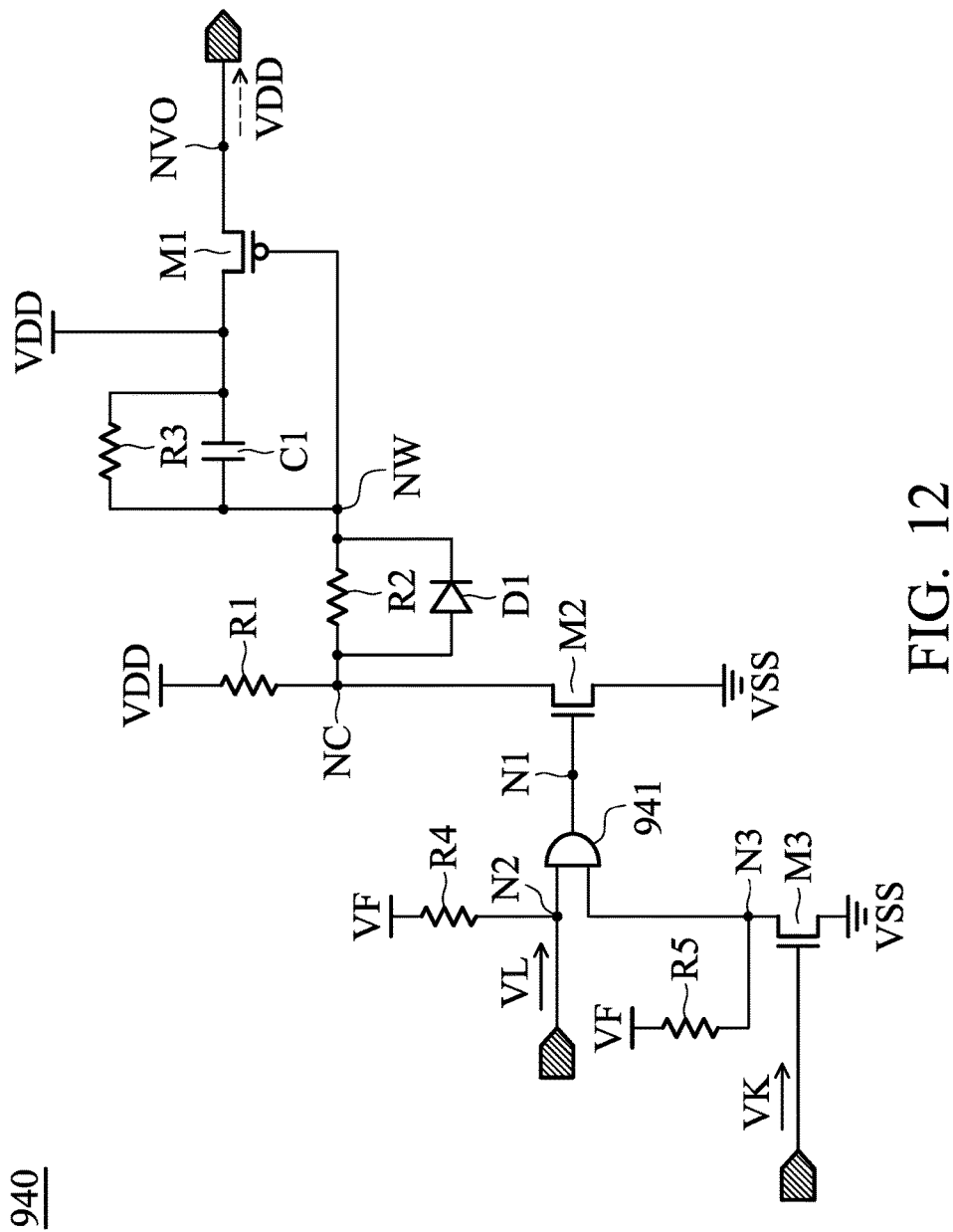
FIG. 12 is a diagram of a hot-plug protection circuit according to another embodiment of the invention.

FIG. 12 is a diagram of a hot-plug protection circuit 940 according to another embodiment of the invention. FIG. 12 is similar to FIG. 10. In the embodiment of FIG. 12, the hot-plug protection circuit 940 further includes a second transistor M2, a third transistor M3, an AND gate 941, a fourth transistor R4, and a fifth transistor R5. Each of the second transistor M2 and the third transistor M3 may be an NMOS transistor. The second transistor M2 has a control terminal coupled to a first node N1, a first terminal coupled to a ground voltage VSS (e.g., 0V), and a second terminal coupled to the control node NC. The AND gate 941 has a first input terminal coupled to a second node N2 for receiving a power enable voltage VL, a second input terminal coupled to a third node N3, and an output terminal coupled to the first node N1. The fourth resistor R4 has a first terminal coupled to a fixed voltage VF (e.g., 3V), and a second terminal coupled to the second node N2. The fifth resistor R5 has a first terminal coupled to the fixed voltage VF, and a second terminal coupled to the third node N3. The third transistor M3 has a control terminal for receiving a device notification voltage VK, a first terminal coupled to the ground voltage VSS, and a second terminal coupled to the third node N3. The power enable voltage VL may be generated by a processor (not shown) according to a software program. The power enable voltage VL is auxiliary and helps to control the hot-plug protection circuit 940 to determine whether to output the supply voltage VDD to the connector 110. Specifically, only when the power enable voltage VL has a high logic level and the device notification voltage VK has a low logic level, the voltage at the control node NC is pulled down to a low logic level, such that the voltage output node NVO of the hot-plug protection circuit 940 can output the supply voltage VDD; otherwise, the voltage output node NVO of the hot-plug protection circuit 940 cannot output the supply voltage VDD. Other features of the hot-plug protection circuit 940 of FIG. 12 are similar to those of the hot-plug protection circuit 920 of FIG. 10. Accordingly, these embodiments can achieve similar levels of performance.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Note that the above element parameters are not limitations of the invention. A designer can fine-tune these settings or values according to different requirements. It should be understood that the electronic device and the hot-plug protection circuit of the invention are not limited to the configurations of FIGS. 1-12. The invention may include any one or more features of any one or more embodiments of FIGS. 1-12. In other words, not all of the features displayed in the figures should be implemented in the electronic device and the hot-plug protection circuit of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic device for communicating with an external device, comprising:
   a connector, wherein when the external device is coupled to the connector, the connecter receives a device existence voltage from the external device;
   a controller, generating a first control signal and a second control signal according to the device existence voltage;
   a first voltage source, providing a first voltage;
   a second voltage source, providing a second voltage;
   a first switch element, coupling the first voltage source or the second voltage source to the connector according to the first control signal, such that the first voltage or the second voltage is used as a supply voltage of the external device;
   a third voltage source, providing a third voltage;
   a fourth voltage source, providing a fourth voltage; and a second switch element, coupling the third voltage source or the fourth voltage source to an output node according to the second control signal, such that the third voltage or the fourth voltage is used as a tunable output voltage at the output node.

2. The electronic device as claimed in claim 1, wherein the external device supports an M. 2 standard or an NGSFF (Next Generation Small Form Factor) standard.

3. The electronic device as claimed in claim 2, wherein if the external device supports the M. 2 standard, the device existence voltage has a high logic level, and if the external device supports the NGSFF standard, the device existence voltage has a low logic level.

4. The electronic device as claimed in claim 1, wherein the external device is an SSD (Solid State Disk).

5. The electronic device as claimed in claim 1, wherein the second voltage is higher than the first voltage.

6. The electronic device as claimed in claim 1, wherein if the device existence voltage has a high logic level, the first switch element couples the first voltage source to the connector, and if the device existence voltage has a low logic level, the first switch element couples the second voltage source to the connector.

7. The electronic device as claimed in claim 1, wherein the fourth voltage is higher than the third voltage.

8. The electronic device as claimed in claim 1, wherein if the device existence voltage has a high logic level, the second switch element couples the third voltage source to the output node, and if the device existence voltage has a low logic level, the second switch element couples the fourth voltage source to the output node.

9. The electronic device as claimed in claim 1, further comprising:
a peripheral element, coupled to the output node, and receiving the tunable output voltage.

10. The electronic device as claimed in claim 9, wherein the peripheral element is an expander or a level shifter.

11. The electronic device as claimed in claim 1, wherein the fourth voltage source is integrated with the first voltage source so as to form a single voltage source.

12. An electronic device for communicating with an external device, comprising:
a connector, wherein when the external device is coupled to the connector, the connecter receives a device existence voltage from the external device;
a controller, generating a first control signal and a second control signal according to the device existence voltage;
a first voltage source, providing a first voltage;
a second voltage source, providing a second voltage;
a first switch element, coupling the first voltage source or the second voltage source to the connector according to the first control signal, such that the first voltage or the second voltage is used as a supply voltage of the external device;
a third voltage source, providing a third voltage;
a fourth voltage source, providing a fourth voltage;
a second switch element, coupling the third voltage source or the fourth voltage source to an output node according to the second control signal, such that the third voltage or the fourth voltage is used as a tunable output voltage at the output node; and
a hot-plug protection circuit, coupled between the first switch element and the connector, wherein when the external device is coupled to the connector, the hot-plug protection circuit enables the supply voltage, and when the external device is not coupled to the connector, the hot-plug protection circuit disables the supply voltage.

13. The electronic device as claimed in claim 12, wherein the hot-plug protection circuit selectively enables or disables the supply voltage according to a device notification voltage from the connector.

14. The electronic device as claimed in claim 13, wherein when the external device is coupled to the connector, the device notification voltage has a low logic level, and when the external device is not coupled to the connector, the device notification voltage has a high logic level.

15. The electronic device as claimed in claim 13, wherein the hot-plug protection circuit comprises:
a first resistor, wherein the first resistor has a first terminal coupled to the supply voltage, a second terminal coupled to a control node, and wherein a voltage at the control node is determined according to the device notification voltage;
a second resistor, wherein the second resistor has a first terminal coupled to the control node, and a second terminal coupled to a switch node;
a diode, wherein the diode has an anode coupled to the control node, and a cathode coupled to the switch node;
a third resistor, wherein the third resistor has a first terminal coupled to the switch node, and a second terminal coupled to the supply voltage;
a capacitor, wherein the capacitor has a first terminal coupled to the switch node, and a second terminal coupled to the supply voltage; and
a first transistor, wherein the first transistor has a control terminal coupled to the switch node, a first terminal coupled to the supply voltage, and a second terminal coupled to a voltage output node, and wherein the voltage output node is configured to selectively output the supply voltage to the connector.

16. A hot-plug protection circuit, comprising:
a first resistor, wherein the first resistor has a first terminal coupled to a supply voltage, a second terminal coupled to a control node;
a second resistor, wherein the second resistor has a first terminal coupled to the control node, and a second terminal coupled to a switch node;
a diode, wherein the diode has an anode coupled to the control node, and a cathode coupled to the switch node;
a third resistor, wherein the third resistor has a first terminal coupled to the switch node, and a second terminal coupled to the supply voltage;
a capacitor, wherein the capacitor has a first terminal coupled to the switch node, and a second terminal coupled to the supply voltage; and
a first transistor, wherein the first transistor has a control terminal coupled to the switch node, a first terminal coupled to the supply voltage, and a second terminal coupled to a voltage output node.

17. The hot-plug protection circuit as claimed in claim 16, wherein the first transistor is a PMOS transistor (P-type Metal Oxide Semiconductor Field Effect Transistor).

18. The hot-plug protection circuit as claimed in claim 16, wherein the control node is arranged for receiving a device notification voltage.

19. The hot-plug protection circuit as claimed in claim 16, further comprising:
a second transistor, wherein the second transistor has a control terminal for receiving a power enable voltage, a first terminal for receiving a device notification voltage, and a second terminal coupled to the control node.

20. The hot-plug protection circuit as claimed in claim 16, further comprising:
- a second transistor, wherein the second transistor has a control terminal coupled to a first node, a first terminal coupled to a ground voltage, and a second terminal coupled to the control node;
- an AND gate, wherein the AND gate has a first input terminal coupled to a second node for receiving a power enable voltage, a second input terminal coupled to a third node, and an output terminal coupled to the first node;
- a fourth resistor, wherein the fourth resistor has a first terminal coupled to a fixed voltage, and a second terminal coupled to the second node;
- a fifth resistor, wherein the fifth resistor has a first terminal coupled to the fixed voltage, and a second terminal coupled to the third node; and
- a third transistor, wherein the third transistor has a control terminal for receiving a device notification voltage, a first terminal coupled to the ground voltage, and a second terminal coupled to the third node.

* * * * *